United States Patent Office 3,072,897
Patented Jan. 8, 1963

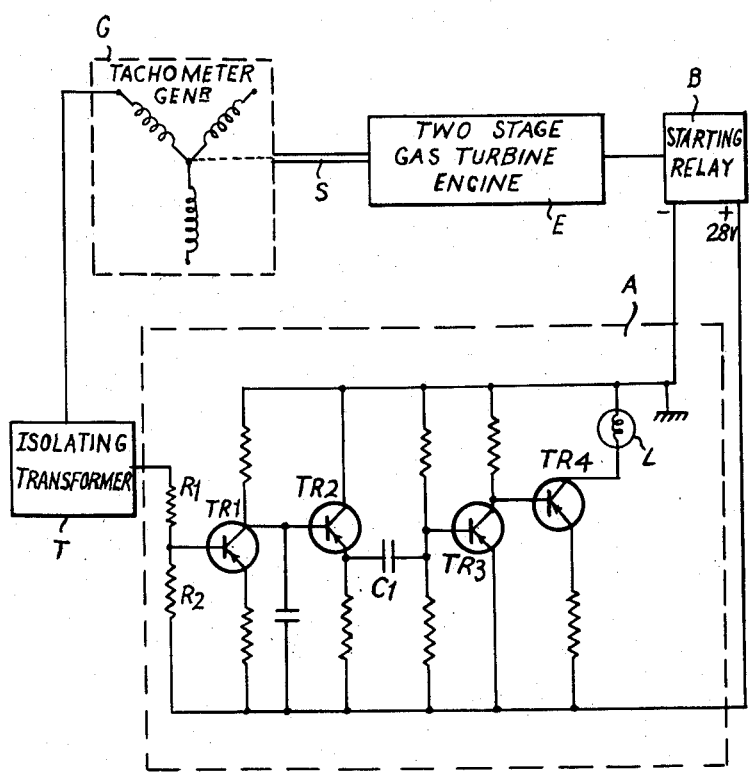

3,072,897
STARTING INDICATOR FOR GAS TURBINES
Keith L. Fisher and Frank Grimm, Cambridge, England, assignors to Pye Limited, Cambridge, England, a company of Great Britain
Filed Mar. 25, 1959, Ser. No. 801,772
Claims priority, application Great Britain Mar. 31, 1958
6 Claims. (Cl. 340—271)

The present invention relates to an arrangement for indicating when a gas turbine engine starts.

Particularly in the case of certain types of multi-stage gas turbine engines, it is essential that an indication should be given if one of the stages should fail to rotate during the starting cycle as otherwise considerable damage may be caused to the engine. For example in a two stage turbine, as is sometimes employed in aircraft, the engine is started by energising a starter relay which causes the high pressure shaft of the turbine to rotate. If, for any reason, the low pressure turbine shaft does not also start to rotate, the starting cycle must be broken or otherwise the engine may explode or otherwise be damaged. Although the low pressure turbine shaft generally drives a tachometer, this is arranged to give accurate readings under operating conditions of the turbine, i.e. at shaft speeds of the order of 4000 r.p.m. and as the initial turning speed of the low-pressure turbine shaft is only of the order of 40 r.p.m. the tachometer is not capable of producing any appreciable indication of this very low speed, and therefore cannot be used to indicate whether the low pressure turbine is rotating.

It is an object of the present invention to provide an arrangement for indicating when a gas turbine has started and which will produce an effective indication at low speeds of rotation of the turbine shaft.

According to the present invention an A.C. voltage is derived from a generator driven by the turbine shaft, and is caused to control the energisation of an indicating lamp. In the case of a multi-stage turbine the generator is driven by the low pressure turbine shaft. Advantageously the A.C. voltage is fed through an amplifier to control the energisation of the lamp which flashes in synchronism with rotation of the shaft. Preferably the amplifier employs one or more semi-conductor amplifying devices, such as transistors.

Where an electrically-operated tachometer is already associated with the turbine, the A.C. voltage may be derived from the tachometer generator driven from the turbine shaft.

According to a feature of the invention the amplifier and indicating lamp are encapsulated or embedded in a synthetic resin material, such as an epoxy resin. This resin may be loaded with phenolic micro-balloons which improve the shock resistance and thermal characteristics of the epoxy resin and reduce the weight of the capsule. The encapsulated form of the device is particularly advantageous where the apparatus has to operate under rigorous conditions, for example in aircraft, and where it has to be capable of operation over a wide range of temperatures.

In order that the invention may be more fully understood, reference will now be made to the accompanying drawing which shows a circuit diagram of one form of starting indicator arrangement according to this invention, which is intended to be operated by a voltage derived from a tachometer generator driven by the low pressure turbine shaft of a two stage gas turbine engine.

Referring to the drawing, the low pressure turbine shaft S of a two stage gas turbine engine E drives a tachometer generator G. A portion of the A.C. Voltage generated by this tachometer generator G is fed to an amplifier A, the input of which consists of a voltage divider R1 and R2. The tachometer generator G may be coupled to the input of the amplifier A through an isolating transformer T, as shown, in order to avoid the need to earth any point of the tachometer. The transformer may have a ratio to improve the impedance matching or may have a 1:1 ratio. The amplifier A comprises two D.C. coupled stages incorporating transistors TR1 and TR2, which are A.C. coupled through a condenser C1 to a transistor switch consisting of transistors TR3 and TR4. A lamp L is connected to the collector of transistor TR4 which allows the passage of current through the lamp L whenever a positive voltage comprising part of the A.C. voltage from the tachometer generator is applied to the base of transistor TR3. The lamp L may be of any appropriate type.

With such an arrangement, if the shaft of the low pressure turbine is rotating during the starting cycle the lamp will produce a flashing indication dependent upon the speed of rotation of the turbine shaft. As the engine speed increases the rate of flashing increases until the lamp glows continuously and the operator knows that the engine is turning freely and running up to speed. If however, the low pressure turbine should fail to rotate the lamp will not light and immediate steps can be taken to break the starting cycle and remedy any fault and thereby prevent damage to the turbine.

By reason of the fact that the output from the tachometer generator G is fed to the base of transistor TR1 through the voltage divider R1 and R2, the tachometer output is attenuated to a safe level whereby no overload of the transistor TR1 will occur even at a maximum speed of the turbine when the output from the tachometer generator is of both maximum frequency and amplitude.

The power supply to the amplifier A and the lamp is arranged to be switched off upon completion of the starting cycle for the gas turbine whereby the lamp is extinguished. Preferably this is achieved automatically by arranging that the power supply to the amplifier and the lamp is derived from the starting relay B for the turbine which is operated during the starting cycle only. The arrangement according to this invention only imposes a negligible load on the tachometer generator.

When fitted to an aircraft the lamp is located on the pilot's instrument panel so that he can observe whether an engine is starting correctly upon operation of the starting switch. In the case of multi-engined aircraft a separate indicating arrangement and lamp may be provided for each engine or alternatively one indicating arrangement and lamp may be selectively switched to indicate the starting of each engine in turn.

Whilst a particular embodiment has been described it will be understood that various modifications may be made without departing from the scope of this invention. For example although the invention has been particularly described as applied to the low pressure stage of a two stage turbine, it may obviously be employed to indicate the starting of any gas turbine engine.

We claim:
1. An arrangement for indicating when both the stages of a two stage gas turbine engine, having a high pressure stage and a low pressure stage, have started, comprising a tachometer generator for indicating rotation of the shaft at high speeds and an indicator circuit for indicating rotation of the shaft at very low speeds, said indicator circuit comprising a transistor amplifier incorporating D.C. coupled stages and a switching stage, a power supply for said amplifier, an isolating transformer connected between the input of said amplifier and a winding of said tachometer generator for feeding a portion of the A.C. voltage from the tachometer generator to the amplifier, a lamp connected to the output of said switching stage, means for feeding the amplified signal to said switching stage and means controlling the energisation of said lamp by the output from said switching stage so that the lamp flashes in synchronism with the rotation of said shaft at low speeds of rotation of the shaft and at higher speeds of rotation of said shaft the lamp is lit substantially continuously.

2. An arrangement for indicating when a shaft is rotating at very low speeds, i.e. of the order of one or a few percent of its normal speed of rotation, comprising an A.C. generator driven by said shaft and an indicator circuit for indicating rotation of the shaft at such very low speeds, said indicator circuit comprising an amplifier, a power supply for said amplifier, circuit means for feeding a portion of the A.C. voltage from the generator to the amplifier, amplifier controlled switching means actuated by a portion of the amplified signal from said amplifier and a lamp connected to the output of said amplifier controlled switching means and controlled by said switching means so that the lamp flashes in synchronism with the rotation of said shaft at low speeds of rotation of the shaft and at higher speeds of rotation of said shaft the lamp is lit substantially continuously.

3. An arrangement for indicating when a shaft is rotating both at high speeds and at very low speeds, i.e. of the order of only one percent of its normal speed of rotation, comprising a tachometer generator driven by said shaft for indicating rotation of the shaft at high speeds and an indicator circuit for indicating rotation of the shaft at very low speeds, said indicator circuit comprising an amplifier, a power supply for said amplifier, circuit means connected between the input of said amplifier and a winding of said tachometer generator for feeding a portion of the A.C. voltage from the tachometer generator to the amplifier without overloading said amplifier at high speeds of rotation of said shaft, amplifier controlled switching means actuated by a portion of the amplified signal from said amplifier and a lamp connected to the output of said amplifier controlled switching means and controlled by said switching means so that the lamp flashes in synchronism with the rotation of said shaft at low speeds of rotation of the shaft and at higher speeds of rotation of said shaft the lamp is lit substantially continuously.

4. An arrangement for indicating when all the stages of a multi-stage gas turbine engine, having a high pressure stage and a low pressure stage, have started, comprising a tachometer generator for indicating rotation of the output shaft of the low pressure turbine at high speeds and an indicator circuit for indicating rotation of said output shaft at very low speeds, said indicator circuit comprising an amplifier, a power supply for said amplifier, an isolating transformer connected between the input of said amplfier and a winding of said tachometer generator for feeding a portion of the A.C. voltage from the tachometer generator to the amplifier, amplifier controlled switching means actuated by a portion of the amplified signal from said amplifier and a lamp connected to the output of said amplifier controlled switching means and controlled by said switching means so that the lamp flashes in synchronism with the rotation of said shaft at low speeds of rotation of the shaft and at higher speeds of rotation of said shaft the lamp is lit substantially continuously.

5. An arrangement for indicating when all the stages of a multi-stage gas turbine engine, having a high pressure stage and a low pressure stage, have started to rotate, comprising a tachometer generator for indicating rotation of the output shaft of the low pressure turbine at high speeds and an indicator circuit for indicating rotation of said output shaft at very low speeds, said indicator circuit comprising an amplifier, a power supply for said amplifier, an isolating transformer connected between the input of said amplifier and a winding of said tachometer generator for feeding a portion of the A.C. voltage from the tachometer generator to the amplifier, amplifier controlled switching means actuated by a portion of the amplified signal from said amplifier and a lamp connected to the output of said amplifier controlled switching means and controlled by said switching means so that the lamp flashes in synchronism with the rotation of said shaft at low speeds of rotation of the shaft and at higher speeds of rotation of said shaft the lamp is lit substantially continuously, a starting relay for said gas turbine engine and means for controlling the connection of the power supply to said amplifier upon operation of said starting relay.

6. An arrangement for indicating when all the stages of a multi-stage gas turbine engine, having a high pressure stage and a low pressure stage, have started to rotate, comprising a tachometer generator for indicating rotation of the output shaft of the low pressure turbine at high speeds and an indicator circuit for indicating rotation of said output shaft at very low speeds, said indicator circuit comprising an amplifier, a power supply for said amplifier, a voltage divider connected to the input of said amplifier, an isolating transformer connected between a point on said voltage divider and a winding of said tachometer generator for feeding a portion of the A.C. voltage from the tachometer generator to the amplifier without overloading said amplifier at high speeds of rotation of said output shaft, amplifier controlled switching means actuated by a portion of the amplified signal from said amplifier and a lamp connected to the output of said amplifier controlled switching means and controlled by said switching means so that the lamp flashes in synchronism with the rotation of said output at low speeds of rotation of the shaft and at higher speeds of rotation of said shaft the lamp is lit substantially continuously, a starting relay for said gas turbine engine and means for controlling the connection of the power supply to said amplifier upon operation of said starting relay.

References Cited in the file of this patent

UNITED STATES PATENTS

| | | |
|---|---|---|
| 1,557,291 | Jacobs | Oct. 13, 1925 |
| 1,918,977 | Marrison | July 18, 1933 |
| 2,408,711 | Volz | Oct. 1, 1946 |
| 2,441,185 | Brown | May 11, 1948 |
| 2,683,767 | Cunningham | July 13, 1954 |
| 2,717,993 | Newsom | Sept. 13, 1955 |
| 2,720,617 | Sardella | Oct. 11, 1955 |
| 2,882,505 | Feder | Apr. 14, 1959 |

FOREIGN PATENTS

| | | |
|---|---|---|
| 732,222 | Great Britain | June 22, 1955 |